United States Patent
Yoshie et al.

(10) Patent No.: US 7,631,887 B2
(45) Date of Patent: Dec. 15, 2009

(54) STROLLER

(75) Inventors: Toshiro Yoshie, Tokyo-To (JP); Yutaka Ukitsu, Tokyo-To (JP); Tokihiko Ikuno, Tokyo-To (JP); Toru Miyachi, Iwatsuki (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 11/472,443

(22) Filed: Jun. 22, 2006

(65) Prior Publication Data

US 2006/0237983 A1  Oct. 26, 2006

Related U.S. Application Data

(62) Division of application No. 10/668,200, filed on Sep. 24, 2003, now Pat. No. 7,090,239.

(30) Foreign Application Priority Data

Sep. 24, 2002 (JP) ............... 2002-277556
Apr. 11, 2003 (JP) ............... 2003-108039

(51) Int. Cl.
*B62B 7/08* (2006.01)

(52) U.S. Cl. ............ 280/650; 280/658; 280/647

(58) Field of Classification Search ........... 280/642, 280/644, 647, 648, 650, 658, 47.38, 47.4
See application file for complete search history.

(56) References Cited

U.S. PATENT DOCUMENTS

| | | | |
|---|---|---|---|
| 3,100,652 A | 8/1963 | Schenkman | |
| 3,799,567 A * | 3/1974 | Toda | ............... 280/644 |
| 4,132,429 A | 1/1979 | Woods | |
| 4,272,100 A | 6/1981 | Kassai | |
| 4,317,581 A | 3/1982 | Kassai | |
| 4,369,987 A | 1/1983 | Witherell | |
| 4,411,472 A | 10/1983 | Kassai | |
| 4,618,184 A | 10/1986 | Harvey | |
| 4,684,149 A | 8/1987 | Meyer | |
| 4,763,919 A | 8/1988 | Nakao et al. | |
| 4,765,644 A | 8/1988 | Bell | |
| 4,817,982 A | 4/1989 | Kassai | |
| 4,930,697 A | 6/1990 | Takahashi et al. | |
| 4,953,887 A | 9/1990 | Takahashi et al. | |
| 5,197,753 A | 3/1993 | Liu | |
| 5,370,408 A * | 12/1994 | Eagan | ............... 280/33.994 |
| 5,622,377 A | 4/1997 | Shamie | |
| 5,741,021 A | 4/1998 | Saint et al. | |

(Continued)

FOREIGN PATENT DOCUMENTS

JP  46-31766  11/1971

(Continued)

*Primary Examiner*—Frank B Vanaman
(74) *Attorney, Agent, or Firm*—Wenderoth, Lind & Ponack, L.L.P.

(57) ABSTRACT

A stroller has front legs and rear legs. Right and left connecting bars connect the front legs and the rear legs, and form a seat support. L-shaped basket-holding rods are connected to rear ends of the connecting bars. Bent rear ends of the right and the left basket-holding rods are disposed opposite to each other and are spaced apart from each other. A rear part of an upper edge of a carrier basket is connected to the basket-holding rods.

3 Claims, 13 Drawing Sheets

U.S. PATENT DOCUMENTS

| | | |
|---|---|---|
| 5,876,046 A | 3/1999 | Courtney et al. |
| 5,938,230 A * | 8/1999 | Huang et al. ................ 280/650 |
| 5,988,669 A | 11/1999 | Freese et al. |
| 6,139,046 A | 10/2000 | Aalund et al. |
| 6,241,273 B1 | 6/2001 | Gehr |
| 6,267,406 B1 | 7/2001 | Huang |
| 6,402,186 B1 | 6/2002 | Garland |
| 6,443,480 B1 * | 9/2002 | Wu ............................ 280/649 |
| 6,523,840 B1 * | 2/2003 | Koppes et al. ........... 280/47.35 |
| 6,814,368 B2 * | 11/2004 | Cheng ........................ 280/642 |

FOREIGN PATENT DOCUMENTS

| | | |
|---|---|---|
| JP | 56-25980 | 6/1981 |
| JP | 63-8158 | 1/1988 |
| JP | 1-133071 | 9/1989 |

* cited by examiner

STROLLER

This application is a divisional of U.S. application Ser. No. 10/668,200, filed Sep. 24, 2003 now U.S. Pat. No. 7,090,239.

TECHNICAL FIELD

The present invention relates to a stroller and, more particularly, to a stroller having a carrier basket.

BACKGROUND ART

Generally, a stroller for taking a baby outdoors for a walk or shopping is provided with a carrier basket placed under a seat to contain baggage and various necessities.

Referring to FIG. 14 showing such a stroller in a perspective view, the stroller has right and left front legs 12 provided with front wheels 11, right and left rear legs 14 provided with rear wheels 13, a substantially U-shaped handle 15, right and left armrests 16, and a detachable guard arm 17 extended between the armrests 16. Rear ends of the armrests 16 are pivotally joined to lower ends of right and left side pipes 18 of the handle 15, respectively. Upper ends of the front legs 12 are pivotally joined to front ends of the armrests 16, respectively. Upper ends of the right and the left rear legs 14 are pivotally joined to middle parts of the armrests 16, respectively. Lower ends of L-shaped brackets 19 are pivotally joined to middle parts of the rear legs 14, respectively. Lower ends of the right and the left side pipes 18 are pivotally joined to middle parts of the brackets 19, respectively. When the stroller is unfolded, locking members 20 slidably mounted on lower parts of the side pipes 18 engage with upper locking parts of the brackets 19 to keep the stroller unfolded.

A front stretcher 21 is extended between the right and the left front legs 12, and a rear stretcher 22 is extended between the right and the left rear legs 14. Connecting bars 23 have front ends pivotally joined to middle parts of the front legs 12, and rear ends pivotally joined together with the brackets 19 to the lower ends of the side pipes 18, respectively. An upper connecting bar 24 is extended between middle parts of the right and the left connecting bars 23.

As shown in FIG. 14, the locking members 20 mounted on the lower ends of the side pipes 18 are engaged with upper locking parts of the brackets 19 to keep the stroller unfolded for use. When an operating device 25 mounted on the handle 15 is operated to disengage the locking members 20 from the brackets 19, the armrests 16 and the connecting bars 23 can be turned upward around pivotal joints. Thus, the front legs 12 and the rear legs 14 can be set substantially parallel to each other to fold the stroller for carrying.

Each of the front stretcher 21, the rear stretcher 22 and the upper connecting bar 24 has two pivotal joints at positions between opposite ends thereof. The pivotal joints of the front stretcher 21, the rear stretcher 22 and the upper connecting bar 24 are included in two parallel, vertical planes, and hence the front stretcher 21, the rear stretcher 22 and the upper connecting bar 24 can simultaneously be folded. Thus, the stroller can be compactly folded as shown in FIG. 15 by turning the right and the left side pipes 18 forward to turn the opposite ends of the front stretcher 21, the rear stretcher 22 and the upper connecting bar 24 after setting the front legs 12 and the rear legs 14 parallel to each other.

Generally, a carrier basket 26 is supported under the seat of a stroller as mentioned above and shown in FIG. 16 (JP2-40667U).

Since only a limited space is available for placing a carrier basket under the seat, only a carrier basket having a limited capacity can be placed under the seat. If a rigid frame is put on an open end of the carrier basket, placed under the seat of a stroller capable of being folded in three, to facilitate putting things in and taking things out of the carrier basket, structural problems arise in the stroller. Therefore, a conventional carrier basket is formed of only a flexible sewn material. This type of basket is extended rearward so that its opening is positioned behind a backrest of the seat, and the open end of the carrier basket is closed by pulling a drawstring 27. The drawstring 27 needs to be pulled to close the carrier basket and to be loosened to open the carrier basket, which makes it inconvenient for a user in terms of putting things in and taking things out of the carrier basket. When a heavy object is put in the carrier basket, it is possible that a lower part of the carrier basket sags and the lower part may scrape the ground. Therefore, as a matter of course, there is a limit to a vertical size of the carrier basket.

In some carrier baskets, a plastic bottom plate is placed therein and a number of straps for suspending a bottom part thereof is increased to prevent the carrier baskets from being dragged along the ground. However, it is possible that the bottom plate makes folding the stroller difficult.

SUMMARY OF THE INVENTION

An object of the present invention to provide a stroller having a carrier basket in which an opening of the carrier basket can be kept open widely when a body structure of the stroller is unfolded.

According to a first aspect of the present invention, a stroller comprises: a body structure including a pair of front legs, a pair of rear legs, right and left connecting bars connecting the front and the rear legs and forming a seat support, and a handle connected to the rear legs; and a carrier basket held on the body structure, wherein L-shaped basket-holding rods having bent rear ends are connected to the right and the left connecting bars connecting the front legs and the rear legs so as to extend rearwardly. The bent rear ends of the right and the left basket-holding rods are disposed opposite to each other and are spaced apart from each other, and a rear part of an upper edge of the carrier basket is connected to the basket-holding rods.

The stroller according to the first aspect is characterized in that the bent rear ends of the right and the left basket-holding rod are connected by a stretchable sewn member.

The stroller according to the first aspect is characterized in that the right and the left basket-holding rods are pivotally joined, together with the connecting bars, to lower end parts of the handle.

According to a second aspect of the present invention, a stroller comprises: a body structure including a pair of front legs, a pair of rear legs, a rear stretcher extended between the rear legs, and a handle connected to the rear legs; and a carrier basket held on the body structure, wherein a basket-holding member is supported on the rear stretcher of the body structure, a horizontal rod is connected to the basket-holding member so as to extend parallel to the rear stretcher, and a rear part of an upper edge of the carrier basket is connected to the horizontal rod.

The stroller according to the second aspect is characterized in that pipes are supported on the rear stretcher so as to be longitudinally movable relative to the body structure, and the basket-holding member is fastened to rear ends of the pipes.

The stroller according to the second aspect is characterized in that the basket-holding member is provided with a projection extending obliquely upward toward the rear, and the horizontal rod is fastened to an upper end part of the projection.

The stroller according to the second aspect is characterized in that pins are placed on the pipes supported on the rear stretcher longitudinally movable relative to the body structure, and the pins are pressed so as to engage holes formed in the rear stretcher when the pipes are pulled to their rearmost positions, respectively.

According to a third aspect of the present invention, a stroller comprises: a body structure including a pair of front legs, a pair of rear legs, right and left connecting bars connecting the front and the rear legs and forming a seat support, and a handle connected to the rear legs; and a carrier basket held on the body structure, wherein longitudinal basket-holding rods are connected to rear end parts of the right and the left connecting bars connecting the front legs and the rear legs, and a rear part of an upper edge of the carrier basket is connected to rear end parts of the right and the left basket-holding rods.

The stroller according to the third aspect is characterized in that the basket-holding rods have S-shaped middle parts, respectively, and base end parts of the basket-holding rods are joined to the connecting bars by joining members so as to be turnable about their axes in an angular range.

The stroller according to the third aspect is characterized in that a bottom wall of the carrier basket has a plurality of transverse tubular parts, and shaping wires are inserted in the tubular parts.

The stroller according to the third aspect is characterized in that a transverse wire is extended in a stepped part of a rear wall of the carrier basket between a rear part of an upper edge of the carrier basket and a rear stretcher.

DETAILED DESCRIPTION OF THE PREFERRED EMBODIMENTS

Preferred embodiments of the present invention will be described with reference to the accompanying drawings.

Figure 1:
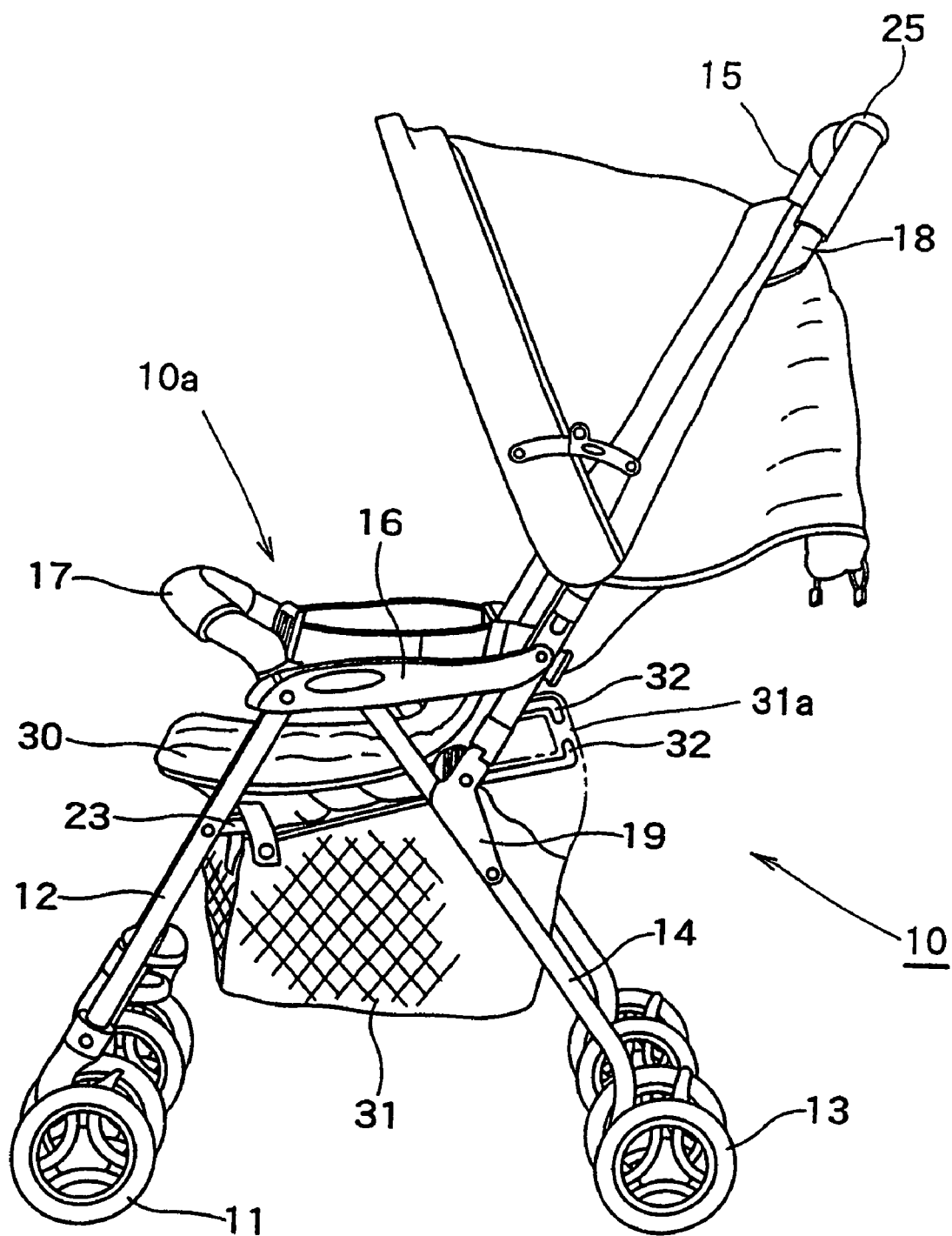
FIG. 1 is a partly sectional perspective view of a stroller in a first embodiment according to the present invention.

Referring to FIG. 1 showing a stroller 10 in a first embodiment according to the present invention in a perspective view, the stroller 10 has a body structure 10a including a pair of front legs 12, a pair of rear legs 14, right and left connecting bars 23 connecting the front legs 12 and the rear legs 14 and forming a seat support, and a handle 15 connected to the rear legs 14; and a carrier basket 31 held on the body structure 10a. The body structure 10a, similarly to the body structure of the conventional stroller shown in FIG. 12, can be folded in three. Large carrier basket 31 is disposed under a seat 30 supported on the seat support.

Figure 2:
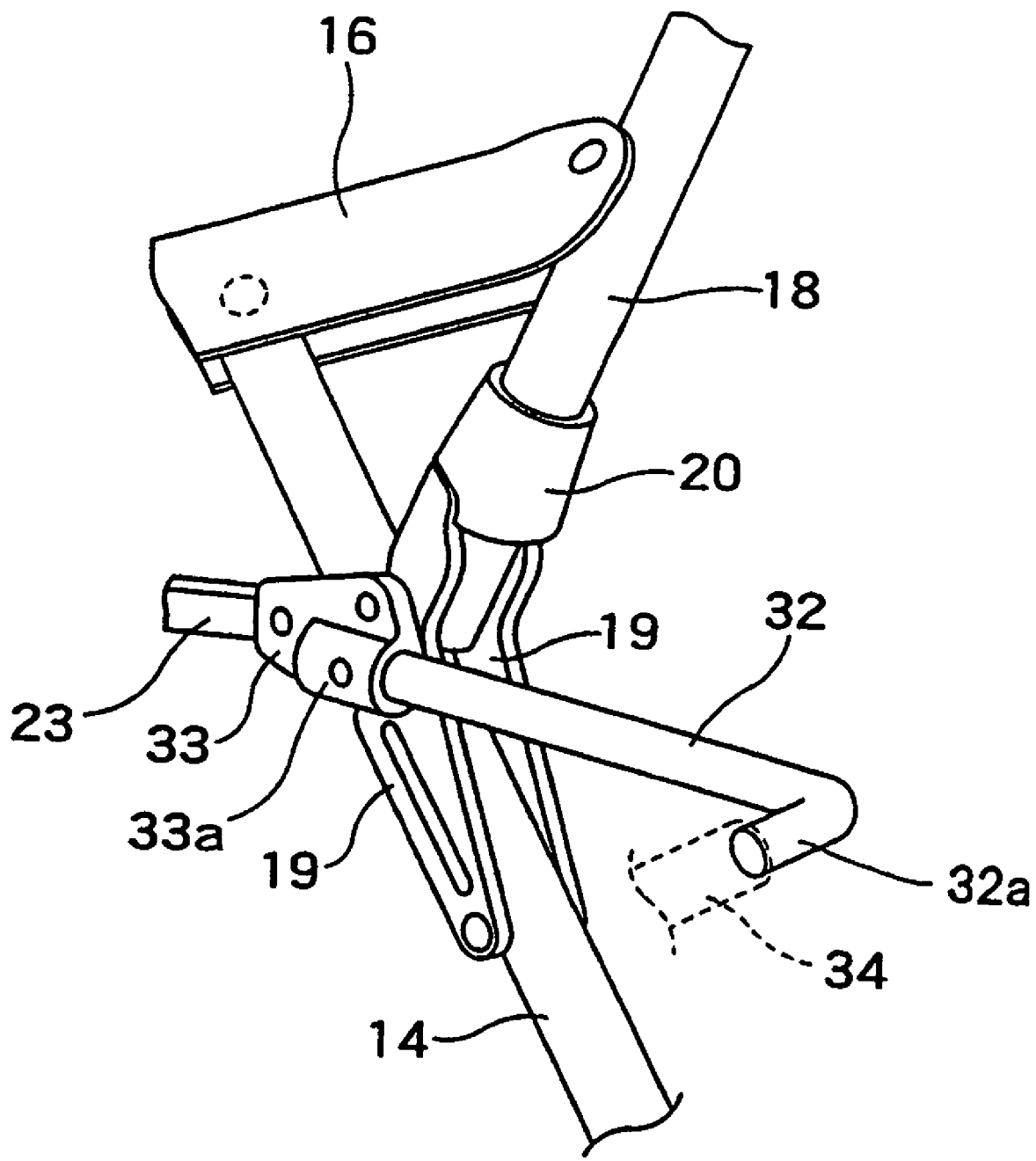
FIG. 2 is an enlarged perspective view of a holding rod attaching structure.

Base end parts of L-shaped basket-holding rods 32 having bent rear ends 32a are connected to rear end parts of the right and the left connecting bars 23 so as to extend rearwardly. The bent rear ends 32a of right and the left basket-holding rods 32 are disposed opposite to each other and are spaced apart from each other. FIG. 2 is a perspective view of a joint of the connecting bars 23 and the basket-holding rods 32. A rear end part of the connecting bar 23 is fastened to a connecting member 33 having a boss 33a. A base end part of the basket-holding rod 32 is fixedly inserted in the boss 33a of the connecting member 33. The connecting member 33 is joined pivotally, together with a bracket 19, to a lower end part of a side pipe 18 of the handle 15. Each basket-holding rod 32 is turnable, together with its connecting bar 23, relative to the side pipe 18. A stretchable sewn member 34 has opposite ends respectively connected to the opposite bent rear ends 32a of the right and the left basket-holding rods 32.

Figure 3:
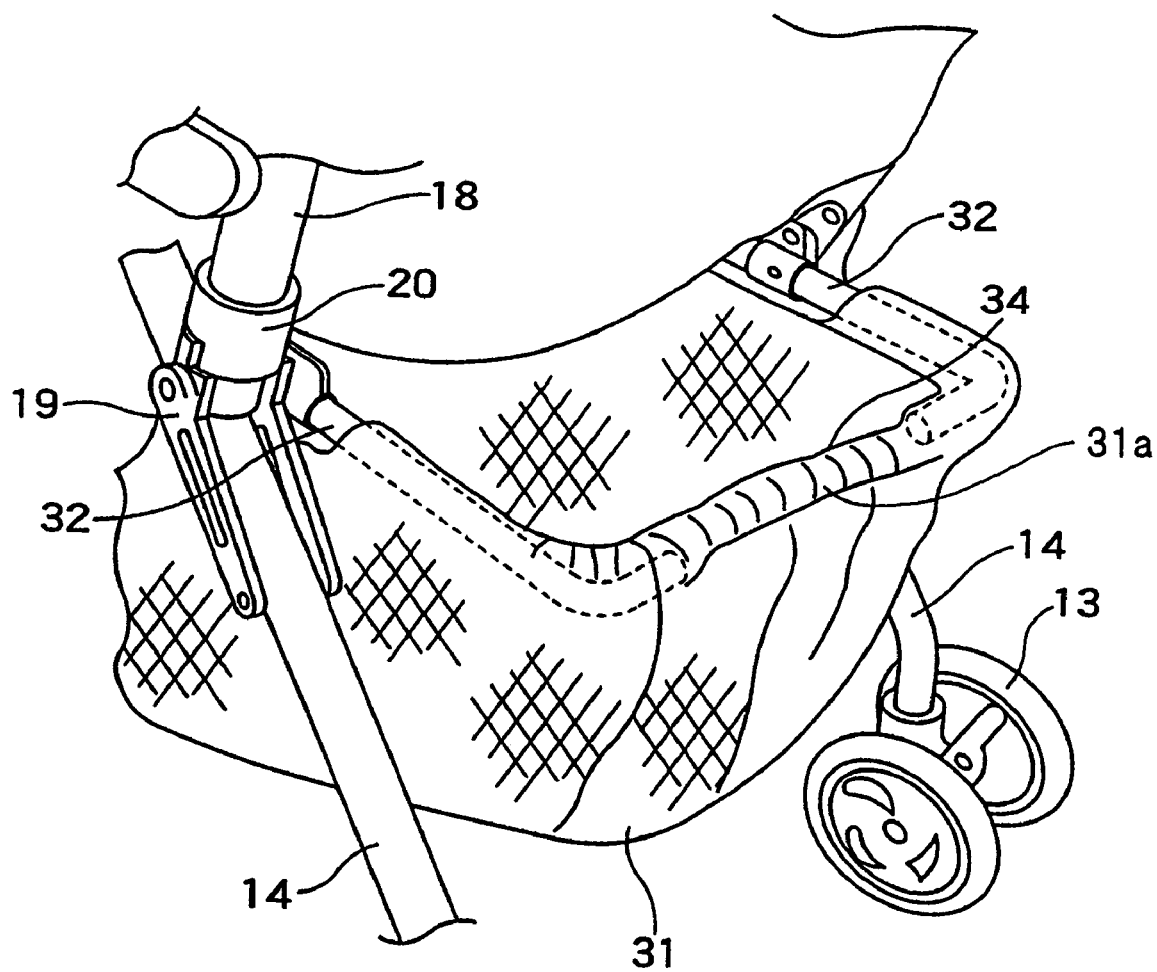
FIG. 3 is a perspective view of an open part of a carrier basket in a state where the stroller is unfolded.

A front part of an upper edge 31a of the carrier basket 31, which is disposed under the seat support formed of the right and the left connecting bar 23, is suspended from the right and the left connecting bars 23. A rear part of an upper edge 31a of the carrier basket 31, extending behind the body structure 10a, is attached to a frame consisting of the right and the left basket-holding rods 32 and the stretchable sewn member 34 extended between the bent rear ends 32a as shown in FIG. 3.

Figure 4:
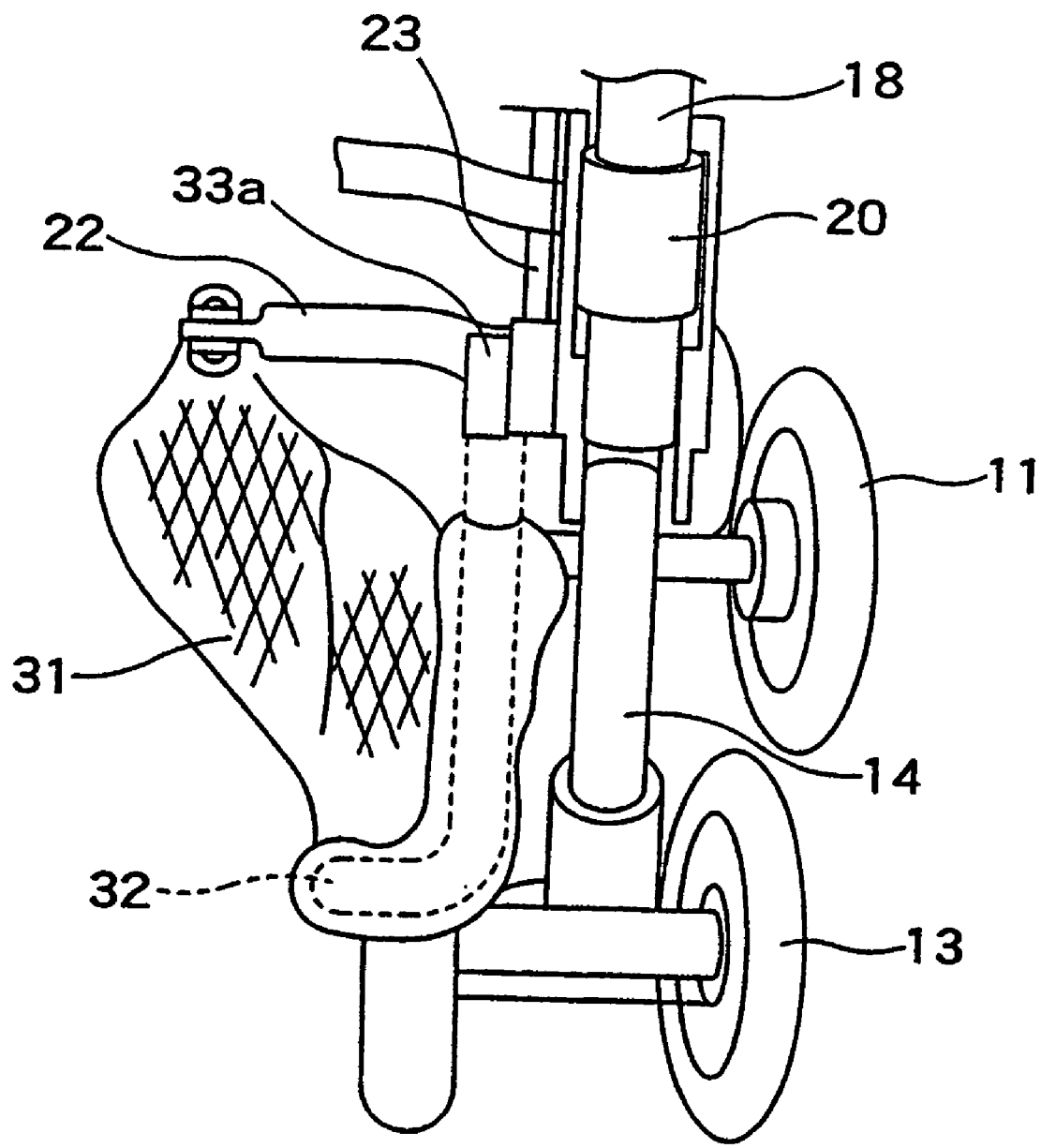
FIG. 4 is a perspective view of the carrier basket in a state where the stroller is folded.

When the body structure 10a is unfolded for use, an opening of the carrier basket 31 extending rearwardly and held by the basket-holding rods 32 is opened widely so that objects can be easily put into and taken out of the carrier basket 31. When the body structure 10a is folded, the right and the left connecting bars 23 turn upward, and the basket-holding rods 32 turn downward. As the body structure 10a is folded in three, a distance between the bent rear ends 32a of the basket-holding rods 32 is increased. Since the bent rear ends 32a are connected by the stretchable sewn member 34, the bent rear ends 32a can easily be moved away from each other, and the body structure 10a can be folded as shown in FIG. 4. Thus, the body structure 10a can be folded without any trouble.

A stroller 10 in a second embodiment according to the present invention will be described with reference to FIGS. 5 to 7. A rear stretcher 22 is extended between rear legs 14. A basket-holding structure 35 is held on the rear stretcher 22. A rear part of an upper edge 31a of the opening of a carrier basket 31, which is suspended by belts 36 from right and left connecting bars 23, is connected to and held by the basket-holding structure 35.

Figure 6:
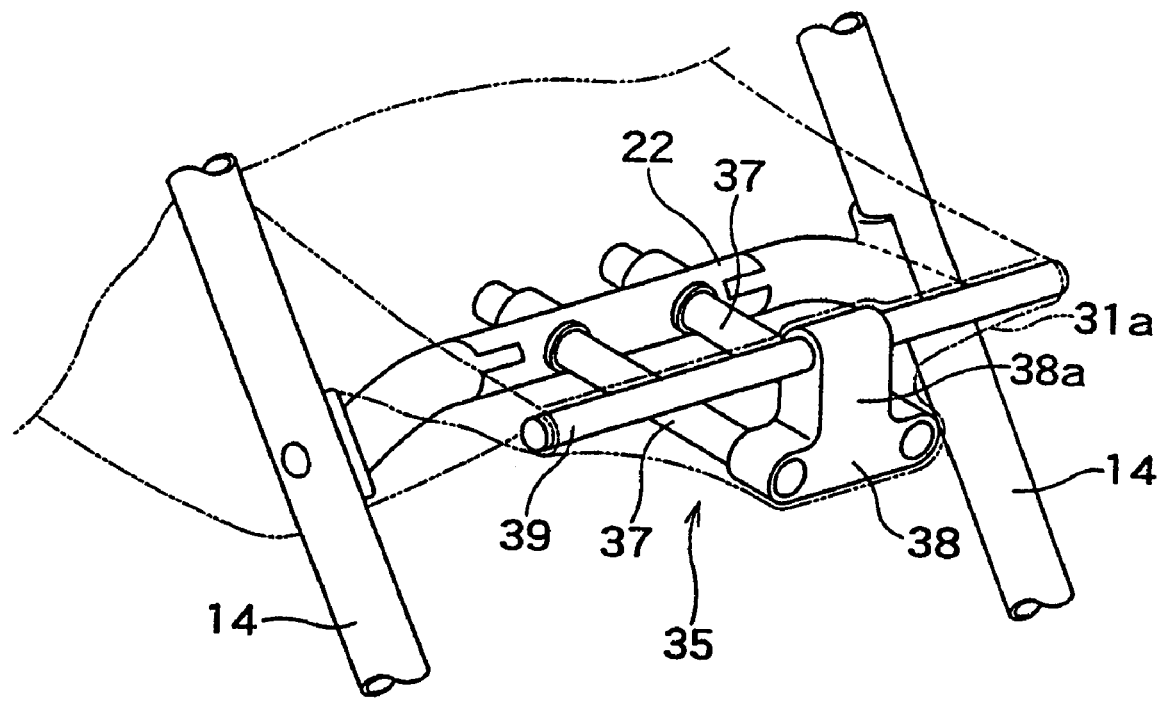
FIG. 6 is a perspective view of a basket holding structure.

Referring to FIG. 6 showing the basket-holding structure 35 in a perspective view, two pipes 37 longitudinally extending relative to a body structure 10a are connected axially slidably in a middle part of the rear stretcher 22 extended between the rear legs 14. A basket-holding member 38 is fixedly attached to rear end parts of the two pipes 37. The basket-holding member 38 has a projection 38a extending obliquely upwardly toward the rear, and a horizontal rod 39 serving as a rear frame member of the carrier basket 31 is fastened to an upper end part of the projection 38a. A rear part of an upper edge 31a of the carrier basket 31 is connected to the horizontal rod 39 as indicated by two-dot chain lines.

Figure 7:
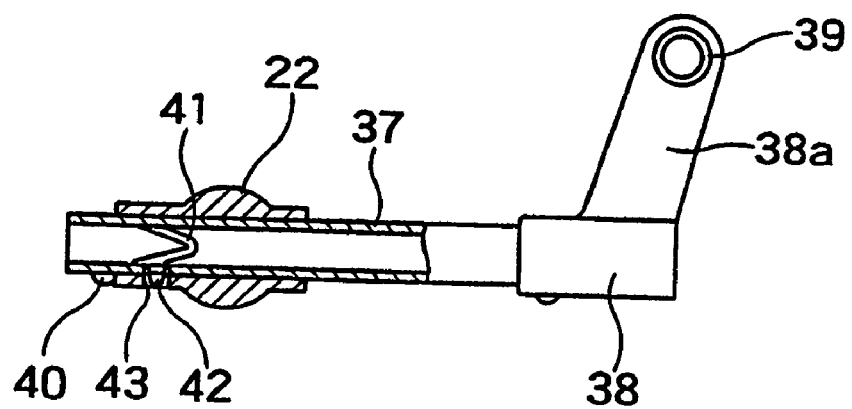
FIG. 7 is a partly sectional side elevation of a pipe included in the basket holding structure.

As shown in FIG. 7, a stopper screw 40 is attached to a base end part of each of the pipes 37 so as to come into contact with a front surface of the rear stretcher 22 to restrain a corresponding pipe 37 from being detached from the rear stretcher 22. A plate spring 41 provided with a pin 42 is inserted in the pipe 37. The pin 42 on the plate spring 41 is fitted in a hole formed in the pipe 37 and is pressed by the plate spring 41 so as to project outside from the pipe 37. When the pipe 37 is pulled rearwardly so that the stopper screw 40 strikes against the rear stretcher 22, the pin 42 on the plate spring 41 engages in a hole 43 formed in the rear stretcher 22 to hold the pipe 37 fixedly in place.

When the horizontal rod 39, to which the rear part of the upper edge 31a of the carrier basket 31 is connected, is pulled rearwardly, the pipes 37 are moved rearward to rearmost positions. In this case, the stopper screws 40 strike against the rear stretcher 22, the pins 42 engage in the holes 43 of the rear stretcher 22, and thereby the pipes 37 are held at the rearmost positions. In this state, the rear part of the upper edge 31a is held fixedly at a position apart from a rear end of a seat held on the body structure 10a by the horizontal pipe 39, and therefore an opening of the carrier basket 31 can be widely opened.

When the horizontal rod 39 is pushed forward to force the pins 42 out of the holes 43 of the rear stretcher 22, the horizontal rod 39 can be moved forward to reduce a longitudinal size (in a direction of front to rear) of the carrier basket 31.

Although the horizontal pipe 39 can be moved together with the pipes 37 to adjust size of the carrier basket 31, the pipes 37 may be fastened to the rear stretcher 22 and the size of the carrier basket 31 may be fixed.

A stroller 10 in a third embodiment according to the present invention will be described with reference to FIGS. 8 to 10. Each of cranked basket-holding rods 45 has a tip end part 45a, a base end part 45b and an S-shaped middle part 45c. Base end parts 45b of the basket-holding rods 45 are connected to rear end parts of right and left connecting bars 23 forming a seat support, respectively, so as to project behind a body structure 10a. Referring to FIG. 9 showing a carrier basket 31 attached to the basket-holding rods 45 in a perspective view, a rear part of an upper edge 31a of the carrier basket 31 is connected to rear parts of right and the left basket-holding rods 45. As shown in FIG. 10, a middle part of each basket-holding rod 45 is bent substantially at two positions in opposite directions to form the S-shaped middle part 45c. The tip end part 45a and the base end part 45b of the basket-holding rod 45 extend parallel in opposite directions, respectively. The rear part of the upper edge 31a of the carrier basket 31 is on right and left sides connected to the tip end parts 45a of the basket-holding rods 45.

Joining members 46 respectively provided with bosses 46a are fixed to rear ends of the connecting bars 23. The base end parts 45b of the basket-holding rods 45 are fitted into holes formed in the bosses 46a of the joining members 46 so as to be turnable in an angular range. As shown in FIG. 10, a circumferential slot 47 is formed in the boss 46a of each joining member 46, and a stopping screw 48 is attached to the base end part 45b of the basket-holding rod 45 so as to move in the circumferential slot 47. Thus, the basket-holding rod 45 is able to turn in an angular range corresponding to an angular range of the stopping screw 48 defined by the circumferential slot 47. The joining member 46 is pivotally connected together with bracket 19 to a lower part of side pipe 18 of handle 15, and hence the basket-holding rod 45 is able to turn together with the connecting bar 23 relative to the side pipe 18.

A tubular border 49 is formed along the rear part of the upper edge 31a of the carrier basket 31. A shaping wire 50, such as a plastic filament, is inserted in the tubular border 49.

Figure 11A:
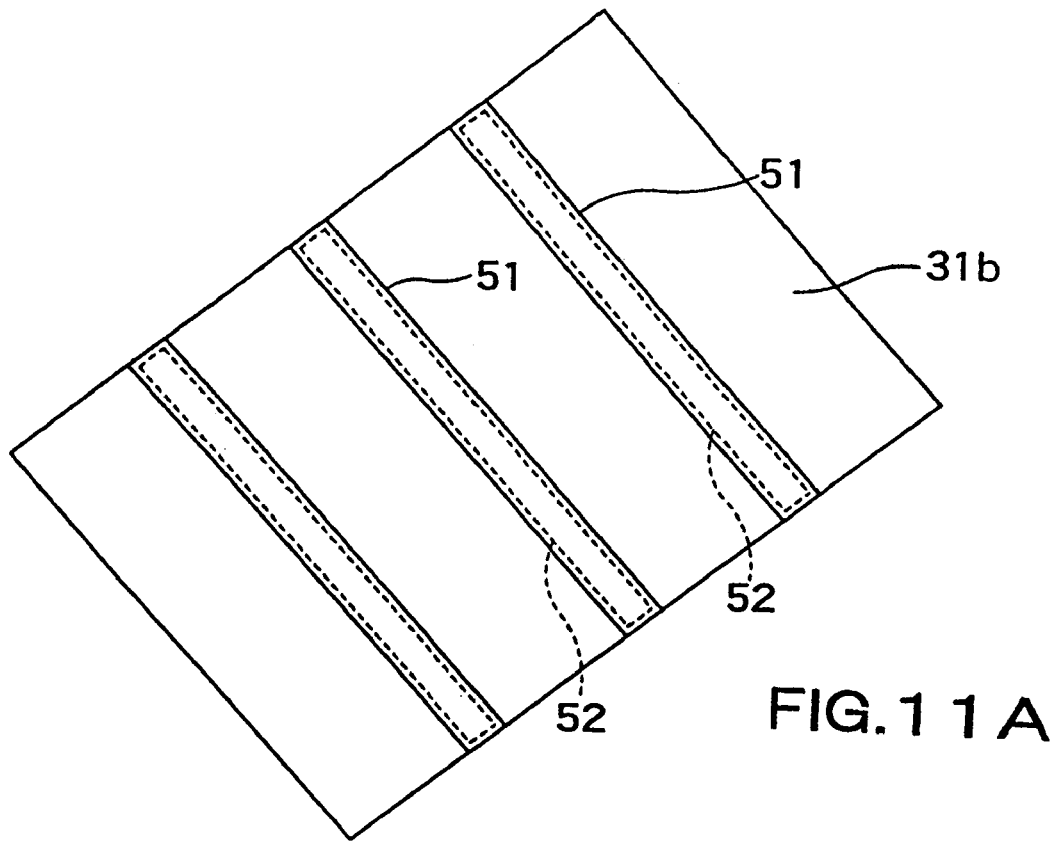
FIG. 11A is a plan view of a bottom part of a carrier basket according to the present invention.
Figure 11B:
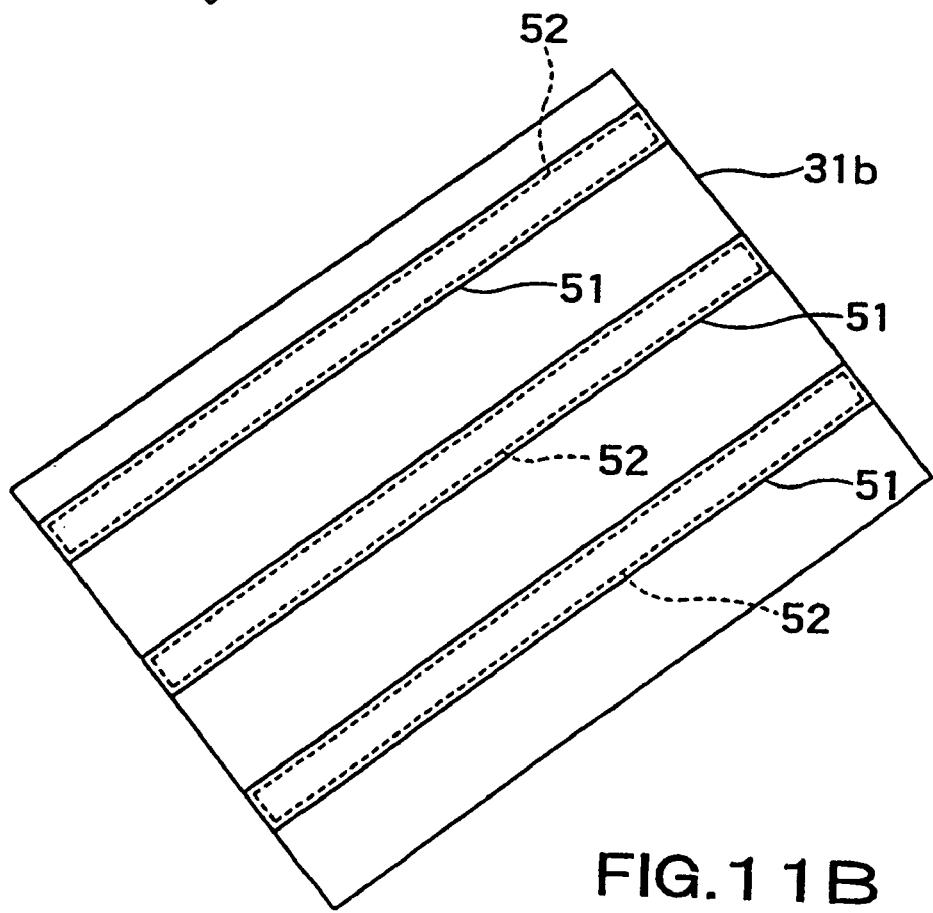
FIG. 11B is a plan view of a bottom part of a carrier basket according to the present invention.

A plurality of transverse tubular parts 51, as shown in FIG. 11A, or a plurality of longitudinal tubular parts 51, as shown in FIG. 11B, are formed in a bottom wall 31b of the carrier basket 31. Shaping wires 52, such as plastic filaments, are inserted in the tubular parts 51.

When the body structure 10a is unfolded for use, the rear part of the upper edge 31a of the carrier basket 31 is supported on the basket-holding rods 45 on right and left sides. Since the shaping wire 50 keeps the rear part of the upper edge 31a taut, an opening of the carrier basket 31 is kept open widely so that objects can be easily put into and taken out of the carrier basket 31. As the body structure 10a is folded, the right and the left connecting bars 23 turn upward and the basket-holding rods 45 turn downward. A distance between the tip end parts 45b of the right and the left basket-holding rods 45 is increased as the body structure 10a is folded in three. Consequently, the tip end parts 45b of the basket-holding rods 45 turn about their axes such that the tip end parts 45b come close to each other because the base end parts 45a of the basket-holding rods 45 are connected by the rear part of the upper edge 31a of the carrier basket 31. Thus, the basket-holding rods 45 do not obstruct folding of the body structure 10a.

The shaping wires 52, such as plastic filaments, prevent the bottom wall 31b of the carrier basket 31 effectively from sagging even if things are put in the carrier basket 31. Thus, the carrier basket 31 is able to maintain its original shape and an appearance of the carrier basket 31 may not be spoiled.

Although the basket-holding bars 45 in this embodiment are cranked and can be turned about the axes of the tip end parts 45b, the basket-holding bars 45 do not need to be cranked, or do not need to be supported for turning, as long as basket-holding rods 45 do not obstruct folding of foldable body structure 10a.

Figure 12:
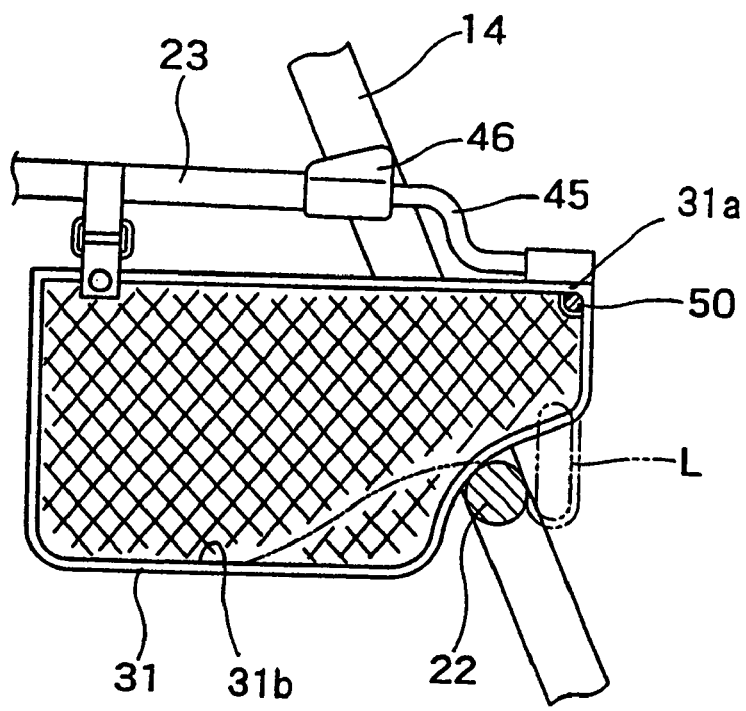
FIG. 12 is a side elevational view of assistance in explaining movement of a conventional carrier basket.

If a thing L is put in a space near a rear end of large carrier basket 31 held in the lower part of the body structure 10a and extending behind the body structure 10a, a part of the bottom wall will sag under a weight of the thing L as indicated by a two-dot chain line in FIG. 12 to spoil the appearance of the carrier basket 31. In this embodiment, a step 31c is formed in a part of a rear wall of the carrier basket 31, between the rear part of the upper edge 31a of the carrier basket 31 and the rear stretcher 22, and a shaping wire 53, such as a plastic filament, is extended parallel to the rear part of the upper edge 31a of the carrier basket 31 in the step 31c.

The shaping wire 53 placed in the step 31c can prevent lateral deformation of the carrier basket 31. Consequently, the bottom wall 31b of the carrier basket 31 will not sag and the appearance of the carrier basket 31 will not be spoiled.

Figure 5:
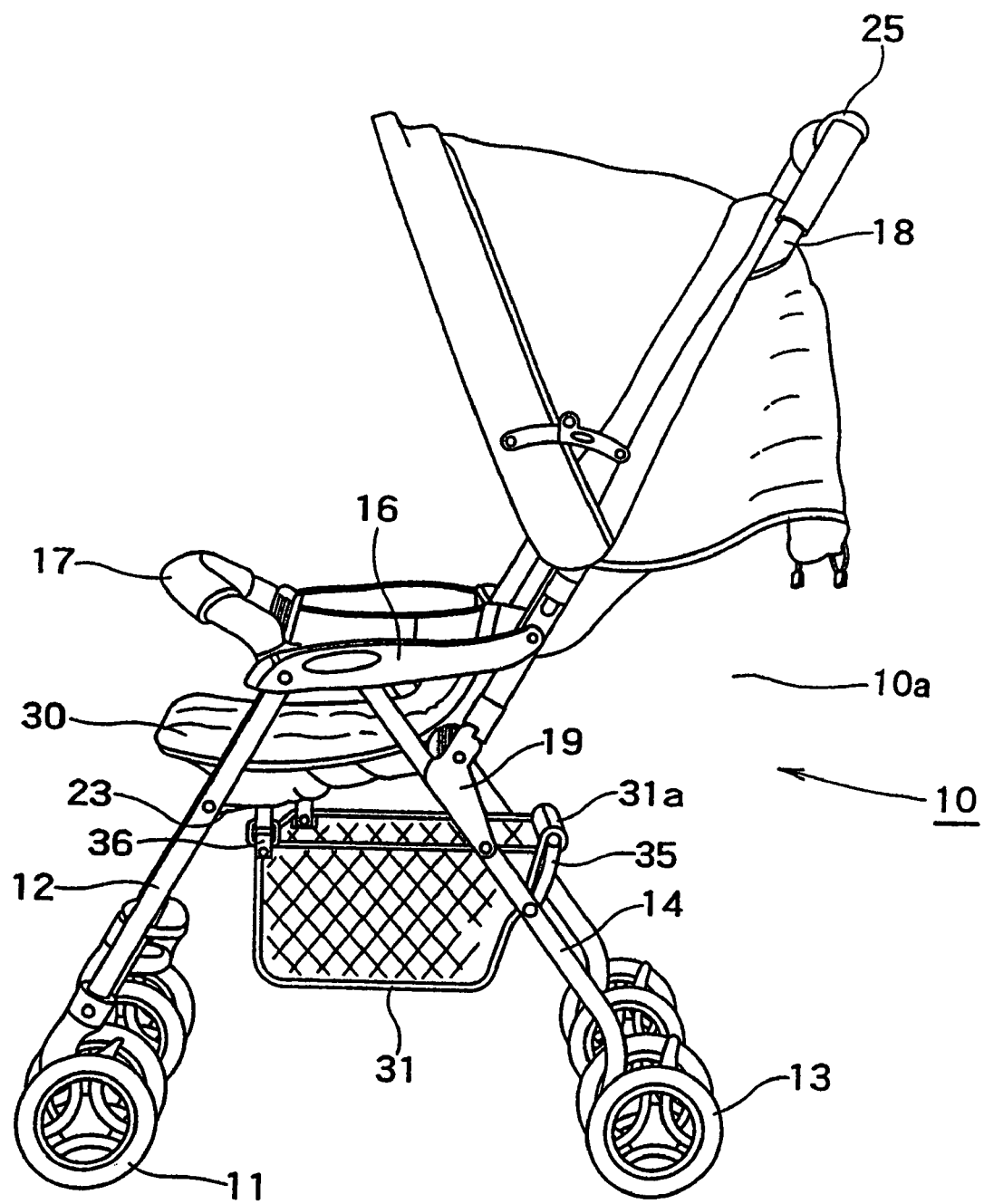
FIG. 5 is a perspective view of a stroller in a second embodiment according to the present invention.
Figure 8:
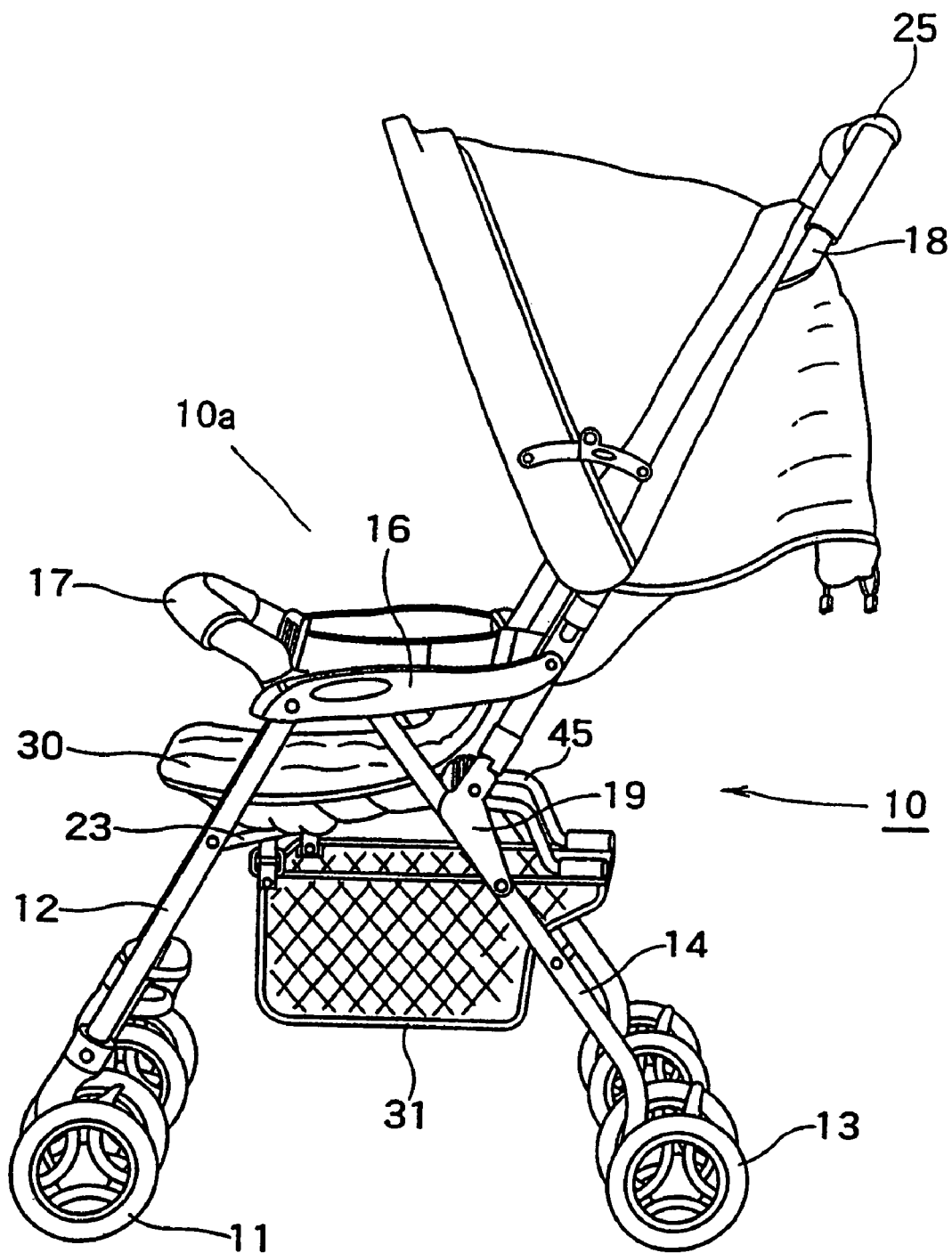
FIG. 8 is a perspective view of a stroller in a third embodiment according to the present invention.
Figure 9:
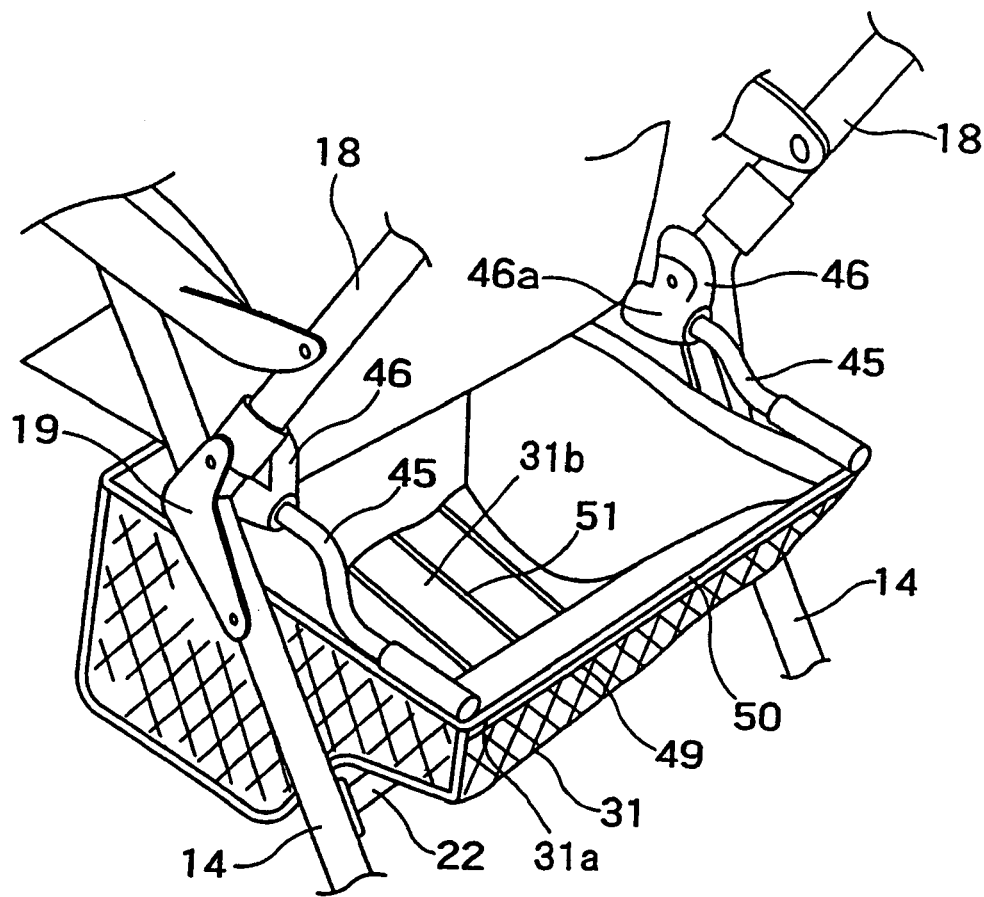
FIG. 9 is an enlarged view of a basket-holding structure included in the stroller sown in FIG. 8.
Figure 10:
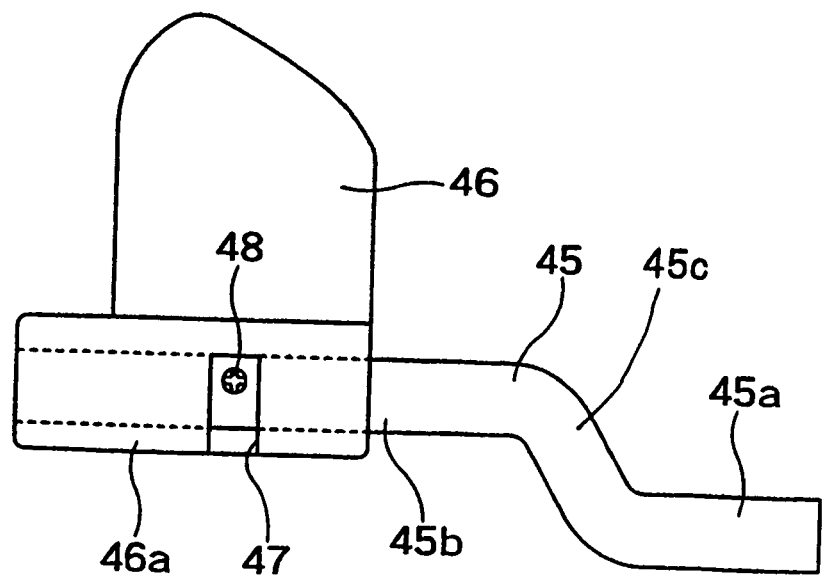
FIG. 10 is a side elevational view of a basket holding rod shown in FIG. 9.
Figure 13:
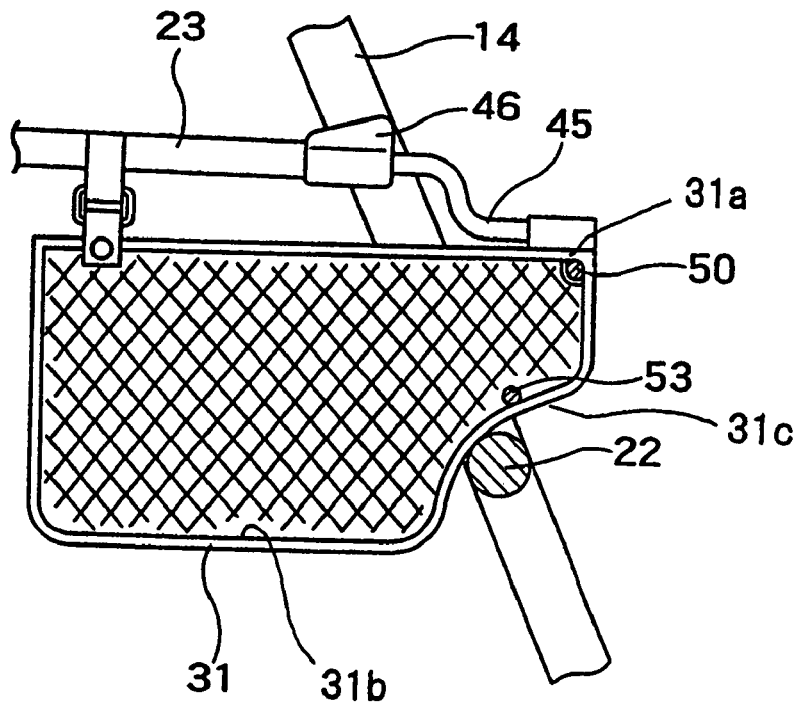
FIG. 13 is a side elevational view of a carrier basket according to the present invention.
Figure 14:
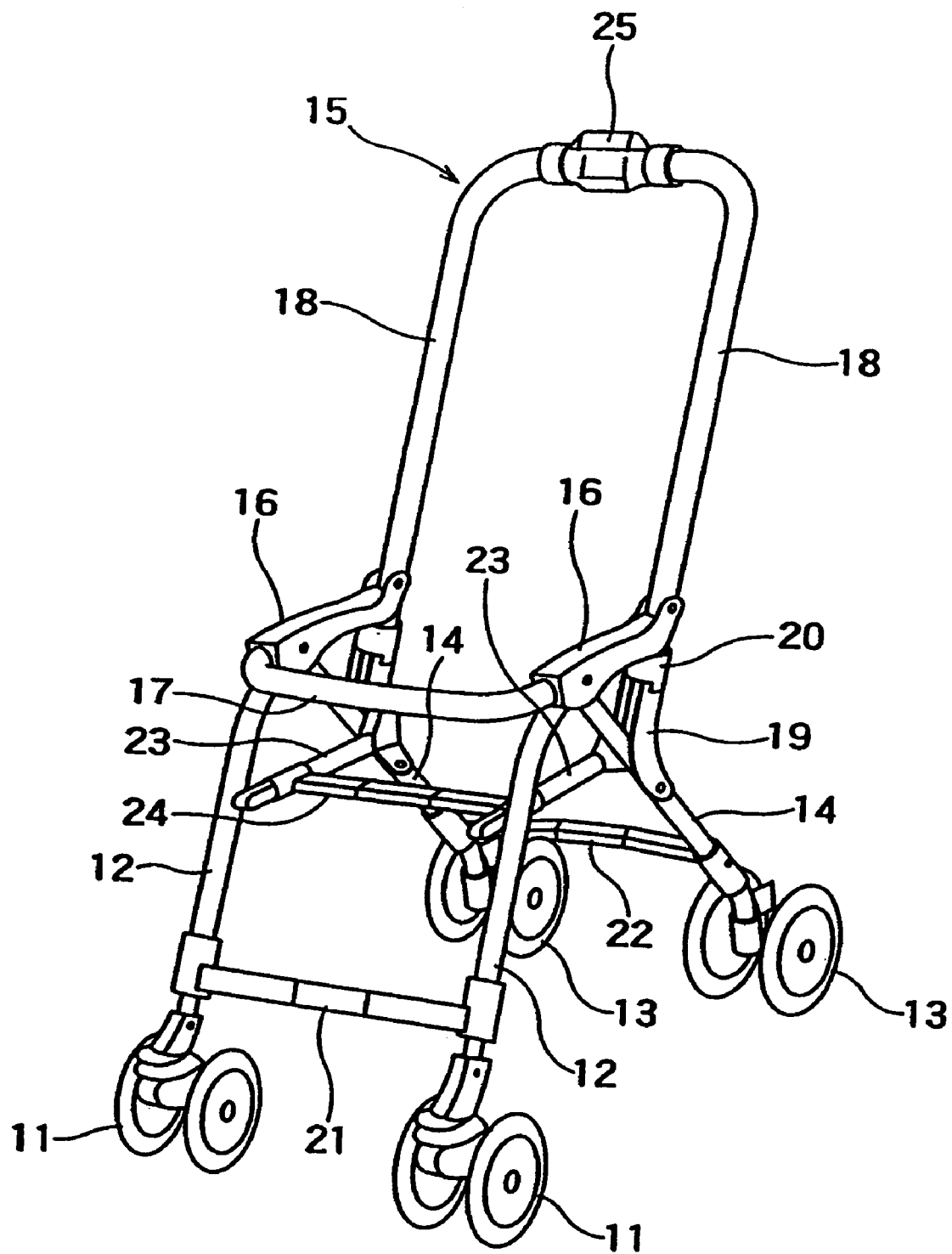
FIG. 14 is a schematic perspective view of a body structure of a foldable stroller capable of being folded in three.
Figure 15:
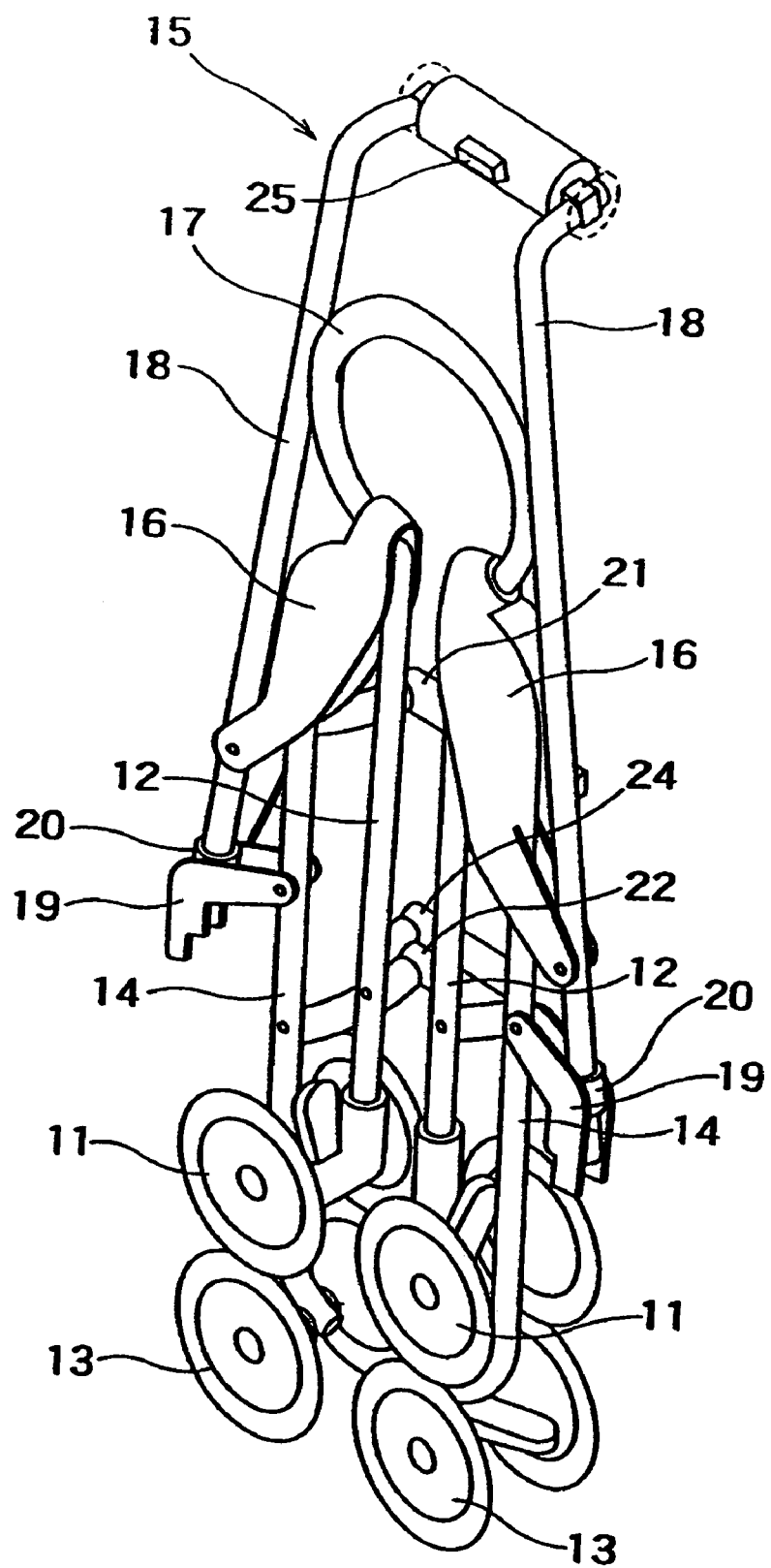
FIG. 15 is a perspective view of the body structure of the foldable stroller, capable of being folded in three, in a folded state.
Figure 16:
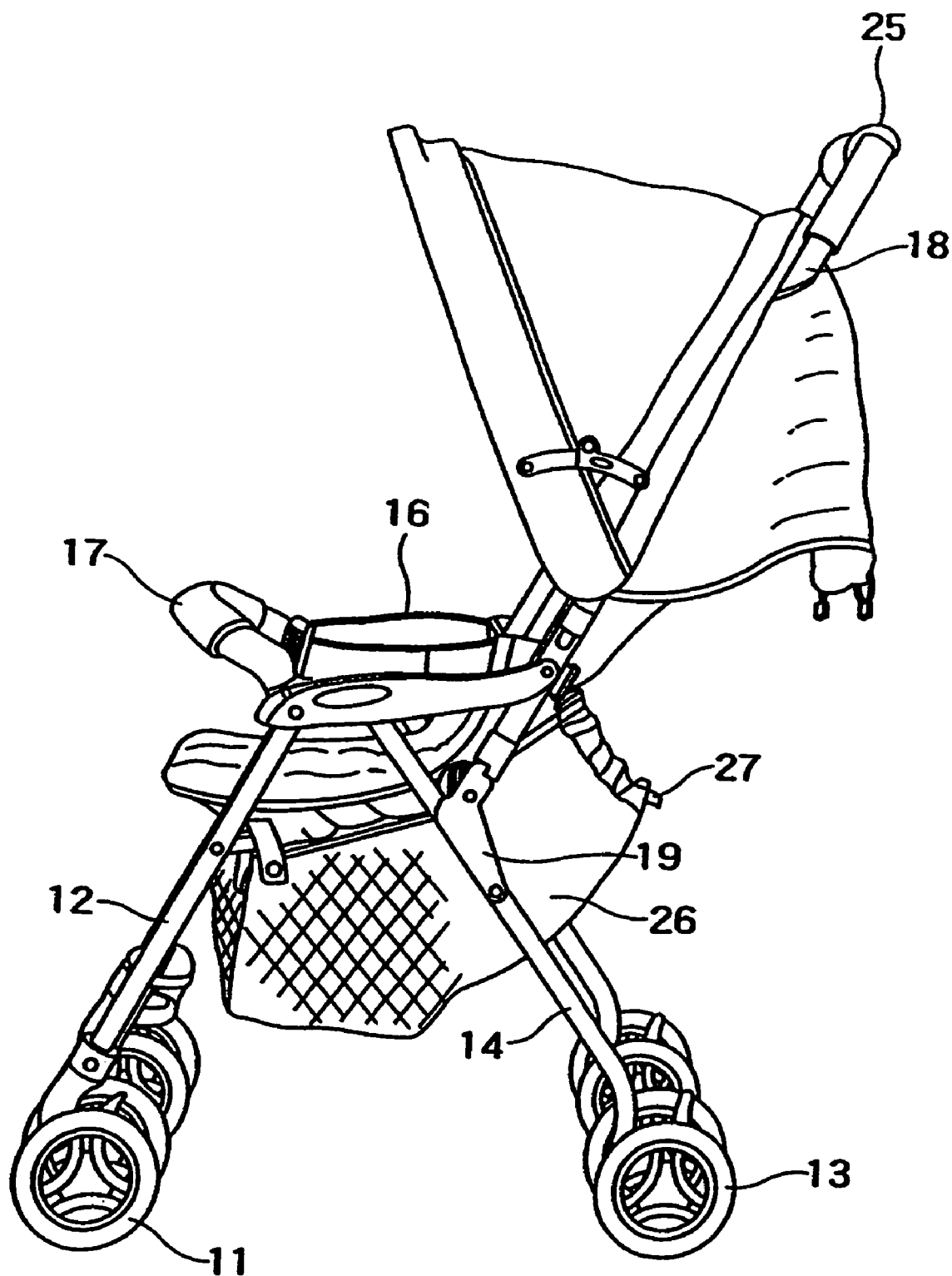
FIG. 16 is a perspective view of a stroller provided with a conventional carrier basket.

The carrier basket 31 provided with the shaping wires 52 and the tubular parts 51 as shown in FIG. 11A or 11B, and the shaping wire 53 as shown in FIG. 13, is applicable to any one of the strollers 10 in the first embodiment shown in FIGS. 1 to 4, the second embodiment shown in FIGS. 5 and 7, and the third embodiment shown in FIGS. 8 to 10.

As apparent from the foregoing description, according to the present invention, basket-holding rods are connected to rear ends of connecting bars connecting front and rear legs of a body structure of a stroller and forming a seat support, or a basket support structure is mounted on a rear stretcher. A rear part of an upper edge of a carrier basket is connected to the basket-holding rods or the basket support structure. Thus, an opening of the carrier basket is kept open widely when the body structure of a stroller is unfolded so that objects can be easily put in and taken out of the carrier basket, and the carrier basket may be a large one having a large capacity and a rear part extending behind the body structure. Thus, the carrier basket is able to contain a large amount of objects. The carrier basket does not obstruct folding of the body structure of the stroller.

The invention claimed is:

1. A stroller comprising:
   a body structure including
   (i) two front legs,
   (ii) two rear legs,
   (iii) right and left connecting bars connecting said two front legs to said two rear legs, respectively, and forming a seat support, and
   (iv) a handle connected to said two rear legs;
   longitudinal basket-holding rods connected to rear end parts of said right and left connecting bars, respectively; and
   a carrier basket supported on said body structure, with a rear part of an upper edge of said carrier basket being connected to rear end parts of said longitudinal basket-holding rods,
   wherein said rear part of said upper edge of said carrier basket includes a tubular border and a shaping wire within said tubular border, such that said body structure can be folded in three; and
   wherein each of said longitudinal basket holding rods has
   (i) an S-shaped middle part, and
   (ii) a base end part joined to a respective one of said right and left connecting bars by a joining member enabling said base end part to be turnable about an axis within an angular range.

2. The stroller according to 1, wherein
   said carrier basket includes a bottom wall having transverse tubular parts, with shaping wires inserted within said tubular parts, respectively.

3. The stroller according to claim 1, further comprising:
   a transverse wire extended in a stepped part of a rear wall of said carrier basket.

* * * * *